Feb. 1, 1927.

G. E. HOWARD 1,616,370

METHOD OF AND APPARATUS FOR FORMING SHEET GLASS

Filed March 1, 1926    2 Sheets-Sheet 1

INVENTOR
GEORGE E. HOWARD
BY Robson D Brown
ATTY.

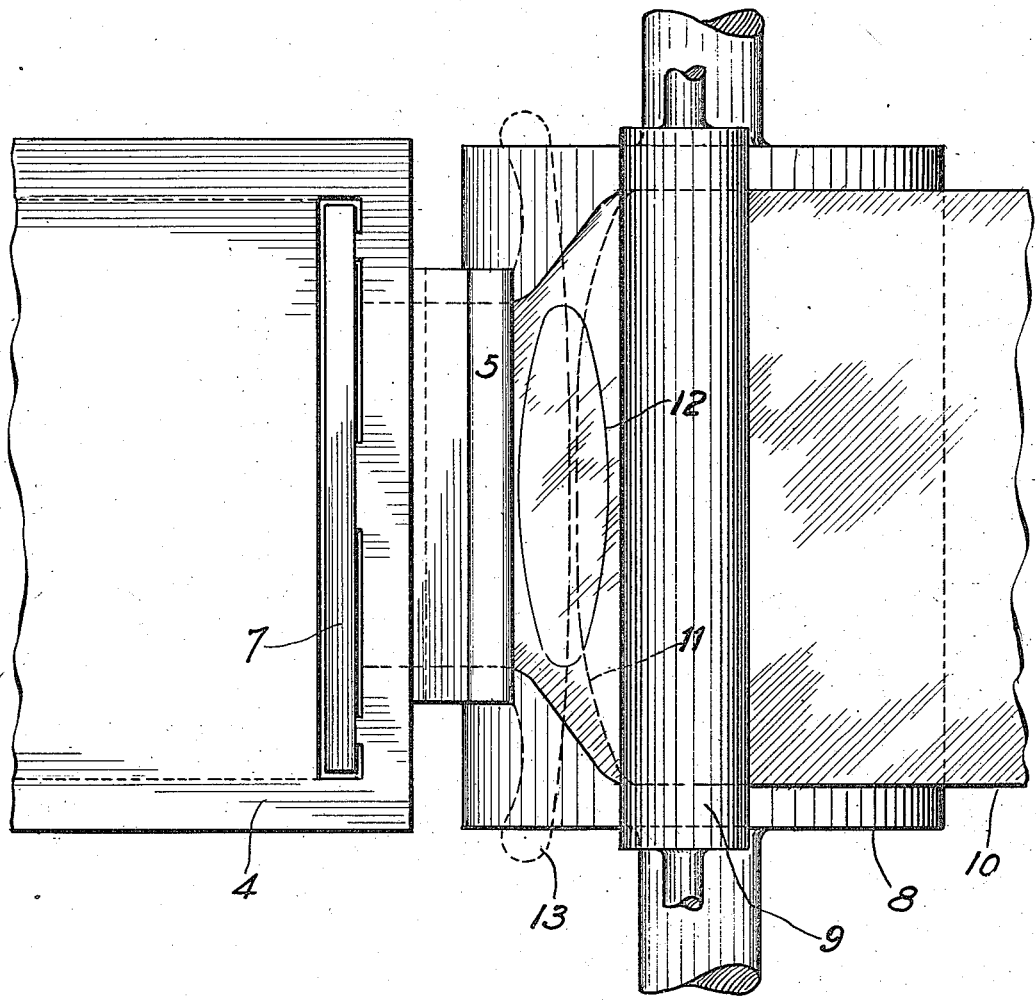

Patented Feb. 1, 1927.

1,616,370

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

METHOD OF AND APPARATUS FOR FORMING SHEET GLASS.

Application filed March 1, 1926. Serial No. 91,347.

My invention relates to a method of and apparatus for forming sheet glass, and particularly to the rolling of plate glass by a continuous process.

Heretofore plate glass has been formed by directing a stream of molten glass through a spout to the top of a roll that is disposed below the adjacent surface of the spout, the upper portion of the roll moving in the same general direction as the stream of glass and carrying the glass beneath a sheet-forming roll. The spout is ordinarily made of a width considerably less than the width of the sheet to be formed therefrom, in order that the glass can be conducted to the rolls in a relatively thick stream so as to avoid the formation of laps and waves that would appear in the completed sheet in the form of "ream". In order to effect spreading movement of the stream of glass after it leaves the spout, the glass has been caused to accumulate in a thick mass against the midportion of the upper roll and to flow longitudinally of the roll so as to form a sheet of the desired width. This contact with the roll chills the glass and causes the cooled particles to become mixed with the hotter particles and thereby causing refractive irregularities in the finished sheet.

One object of my invention is to provide a method and apparatus whereby lateral distribution of a stream of molten glass is facilitated, and the formation of ream and other imperfections reduced to a minimum.

Another object of my invention is to provide means whereby the sheet-forming rolls may be placed closer to the body of the molten glass from which a sheet is formed.

Another object is to provide means whereby it is possible to employ a wider spout and thus reduce lateral spread of the stream of glass.

Still another object of my invention is to simplify and improve generally the methods of and apparatus for forming sheet glass.

Figure 1:
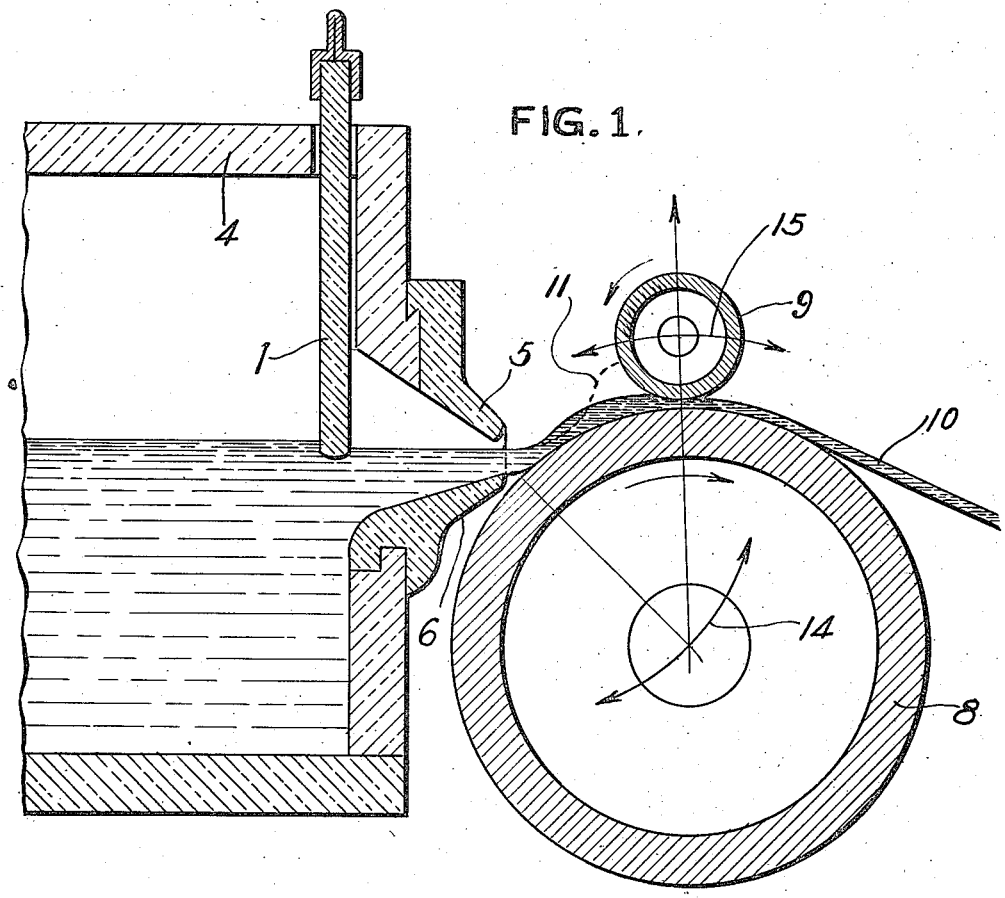
Figure 2:
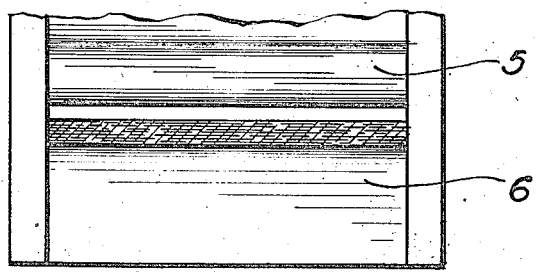

One form which my invention may take is shown in the accompanying drawing, wherein Fig. 1 is a longtiudinal sectional view of a portion of a glass furnace, and showing sheet-forming rolls mounted in operative relation thereto; Fig. 2 is a cross sectional view taken at the front end of the spout of Fig. 1 and looking rearwardly, and Fig. 3 is a plan view of the apparatus of Fig. 1.

The furnace extension or forehearth 4 may be of the usual form, but is provided with a spout 5 that has a bottom wall 6 which is directed upwardly instead of horizontally or downwardly as is usual in devices of this kind. A gate 7 controls the flow of molten glass to the spout and is provided with a rounded bottom edge so that glass may flow under such edge more smoothly than if the lower end of the gate were rectangular in cross section. There is thus less disarrangement of the glass particles relative to one another such as might result in imperfections in the finished sheet of glass.

A roll 8 is provided that serves as a table upon which the glass is first deposited. The glass-receiving surface of this roll advances in the same general direction as the stream of glass and carries the glass beneath a sheet-forming roll 9 that is mounted at such distance above the roll 8 as will result in the formation of a sheet of the desired thickness. The rolls 8 and 9 are driven from any suitable source of power.

It will be observed that as the stream of glass encounters the roll 8 it is carried upwardly. During this upward movement a portion of the glass will be retarded owing to the action of gravity, thus resisting the pull of the roll. As a result, the thickness of the section of the stream will be greater for a given amount of glass discharged per minute than would be the case if this counter gravity action were not present. The stream, being relatively thick, will spread laterally, and this lateral flow will continue until the glass encounters the sheet-forming roll 9, whereupon it is rolled to the desired thickness, and a sheet 10 is formed, which sheet may be carried away in any suitable manner and deposited in a leer.

In some of the older processes, the glass stream when it encounters an upper forming roll accumulates in a thickened mass that assumes the general contour indicated in Fig. 3 by the line 11. By elevating the rolls 8 and 9 so that their sheet-forming surfaces will be in a higher plane than the mouth of the spout, the stream of glass can be made to assume substantially the contour of the line 12, if the temperature of the glass, the elevation of the rolls, and the spout, are properly proportioned. By this means the spread of the stream of glass can be controlled to practically any desired extent, and the glass may be caused to spread to even the distance defined by the line 13.

It will be understood that the contour 11 will not be possible with the roll 8 elevated above the level of the spout as shown in Fig. 1. This particular contour would be a normal condition, if the top of the roll 8 were about on a level with the spout 6. It is the degree of elevation of the roll relative to the spout that is the principal factor in determining these various contours. As between contour 11, Figs. 1 and 3, which brings the glass against the roll 9, and contour 13 whereby the glass has such a backward gravitational tendency that it does not reach the roll 9 but flows off at the edge of the roll 8, there can be almost any degree of distribution of the glass. While some difference in depth is necessary to cause lateral movement, yet the greatest depth can be arranged at some intermediate point and make a contour such as 12, Fig. 3, which will prevent this banking against the roll and at the same time give enough depth or head to the glass to enable it to distribute longitudinally of the roll 9 to fill out the width of the sheet desired. Zone 12 indicates approximately the portion of glass that is higher and thicker than the surrounding glass.

The roll 8 can be adjusted vertically relative to the spout 5, by any suitable means, as by moving the axis of the roll through an arc represented by the line 14. By elevating the roll it will be apparent that glass at a given temperature will be caused to spread to a greater width before reaching the roll 9 than if the roll 8 were placed lower.

The roll 9 may be adjusted through an arc indicated by the line 15 so as to locate it at any desired distance from the spout. Thus, if a rapid spreading action of the glass is being secured, the roll 9 will be moved closer to the spout. The roll 9 may also be adjusted vertically in order to regulate the thickness of the sheet formed.

It will be apparent that the apparatus may be employed in forming plastic materials other than molten glass into sheets or slabs.

I claim as my invention:

1. The method which comprises directing molten glass against an upwardly moving surface, spreading the glass laterally on said surface, and causing said surface to carry the glass past a sheet-forming member.

2. The method which comprises directing a stream of molten glass against a horizontally disposed roll in a plane above the axial plane of said roll and below the uppermost portion of the roll, spreading the glass laterally on said surface, and rotating said roll to advance the glass.

3. The method which comprises directing a stream of molten glass against a horizontally disposed roll in a plane above the axial plane of said roll and below the uppermost portion of the roll, and rotating said roll to advance the glass, the speed of rotation of the roll being such that the glass may flow laterally a substantial distance while advancing.

4. The method which comprises directing a stream of molten glass against the periphery of a horizontally disposed roll, in a plane below the uppermost portion of said roll, and rotating the roll to advance the glass beneath a sheet-forming roll that is disposed in a plane above the first-named roll.

5. Sheet-glass forming apparatus comprising a bottom roll and a top roll, and means for directing a stream of glass against the periphery of the bottom roll in a plane located at a substantial distance below the upper portion of said roll, the bottom roll being rotatable to advance the glass beneath the upper roll and thereby reduce said glass to a sheet of substantially uniform thickness.

6. Apparatus for forming sheet glass, comprising means for supplying a stream of glass of narrow width relative to the sheet to be formed, and a roll having a sheet forming surface substantially equal to the width of the sheet to be formed, the said roll being rotatably mounted in position to receive the stream of glass in a plane below the top of the roll and at a point where the roll and the stream tend to move in opposite directions, to such degree that the stream of glass will spread longitudinally of the roll and be thereby reduced to approximately the thickness of the completed sheet.

7. Apparatus for forming sheet glass, comprising means for supplying a stream of glass of narrow width relative to the sheet to be formed, and a roll having a sheet forming surface substantially equal to the width of the sheet to be formed, the said roll being adjustable in a plane transverse to the plane of said stream and being mounted in position to receive the stream of glass in a plane below the top of the roll and at a point where the roll and the stream tend to move in opposite directions to such degree that the stream of glass will spread longitudinally of the roll and be thereby reduced to approximately the thickness of the completed sheet.

8. Apparatus for forming sheet glass, comprising means for supplying a stream of glass of narrow width relative to the sheet to be formed, and a roll having a sheet forming surface substantially equal to the width of the sheet to be formed, the said roll being adjustable longitudinally of said stream and being mounted in position to receive the stream of glass in a plane below the top of the roll and at a point where the roll and the stream tend to move in opposite directions to such degree that the stream of glass will spread longitudinally of the roll and be thereby reduced to approximately the thickness of the completed sheet.

9. Sheet-glass forming apparatus comprising means for supplying a stream of glass, a roll mounted in position to receive said stream of glass at a substantial distance below the top portion of the roll, the said roll being rotatable to advance the stream of glass, and a top roll disposed above the first named roll at a point in advance of the forward end of the stream of glass and adjustable circumferentially of the first-named roll.

10. The method of forming sheet glass which comprises directing a relatively thick stream of molten glass against a receiving surface and moving said surface in a direction opposite to that in which the glass tends to move, the rate of movement of the said surface being such that the glass is advanced and simultaneously caused to spread laterally, to thereby materially reduce the thickness of the stream.

11. The method of forming sheet glass, which comprises subjecting a body of molten glass to unequal forces that tend to move it in opposite directions, to effect spreading movement of the glass, and rolling the glass so spread.

Signed at city of Butler, Pa., this 17th day of February, 1926.

GEORGE E. HOWARD.